US008736565B2

(12) United States Patent
Kim et al.

(10) Patent No.: US 8,736,565 B2
(45) Date of Patent: May 27, 2014

(54) TOUCH SCREEN PANEL

(75) Inventors: Dong-Ho Kim, Yongin (KR); Ryan Choi, Yongin (KR); Hyung-Pil Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 234 days.

(21) Appl. No.: 13/238,466

(22) Filed: Sep. 21, 2011

(65) Prior Publication Data
US 2012/0306776 A1    Dec. 6, 2012

(30) Foreign Application Priority Data
Jun. 1, 2011 (KR) .................. 10-2011-0052732

(51) Int. Cl.
*G06F 3/041* (2006.01)

(52) U.S. Cl.
USPC ............................................. 345/173

(58) Field of Classification Search
USPC ............................................. 345/173
See application file for complete search history.

(56) References Cited

U.S. PATENT DOCUMENTS

| 8,279,197 B2 * | 10/2012 | Murphy et al. ............... 345/174 |
| 2010/0033443 A1 * | 2/2010 | Hashimoto ................... 345/173 |
| 2010/0079692 A1 * | 4/2010 | Hwang et al. ................. 349/40 |
| 2010/0214247 A1 * | 8/2010 | Tang et al. ................... 345/173 |
| 2011/0057893 A1 | 3/2011 | Kim et al. |
| 2011/0310025 A1 * | 12/2011 | Simmons ...................... 345/173 |

FOREIGN PATENT DOCUMENTS

| KR | 10 2002-0092628 A | 12/2002 |
| KR | 10-2010-0054899 A | 5/2010 |
| KR | 10-2010-0080469 A | 7/2010 |
| KR | 10-2010-0123627 A | 11/2010 |
| KR | 10-2011-0013224 A | 2/2011 |
| KR | 10 2011-0025374 A | 3/2011 |
| KR | 10 2011-0041109 A | 4/2011 |

OTHER PUBLICATIONS

Korean Office Action in KR 10-2011-0052732, dated Jan. 11, 2013 (Kim, et al.).
Korean Notice of Allowance in KR 10-2011-0052732, dated Jun. 14, 2013 (Kim, et al.).

* cited by examiner

*Primary Examiner* — Lixi C Simpson
(74) *Attorney, Agent, or Firm* — Lee & Morse, P.C.

(57) ABSTRACT

An embodiment is directed to a touch screen panel including first sensing electrodes, second sensing electrodes, and a pad unit to be electrically connected to the first sensing electrodes and the second sensing electrodes, the touch screen panel including first trace lines connecting the first sensing electrodes and the pad unit, second trace lines connecting the second sensing electrodes and the pad unit, and a ground line connected to a ground power supply, the ground line being between the first trace lines and the second trace lines.

7 Claims, 3 Drawing Sheets

TOUCH SCREEN PANEL

CROSS-REFERENCE TO RELATED APPLICATION

This application claims priority to and the benefit of Korean Patent Application No. 10-2011-0052732, filed on Jun. 1, 2011, in the Korean Intellectual Property Office, the entire content of which is incorporated herein by reference.

BACKGROUND

1. Field

Embodiments relate to a touch screen panel.

2. Description of the Related Art

A touch screen panel is an input apparatus that may be used for, e.g., inputting a user command by selecting an instruction content displayed on a screen of an image display apparatus. Inputting the user command may be done by, e.g., a human hand or an object.

SUMMARY

An embodiment is directed to a touch screen panel including first sensing electrodes, second sensing electrodes, and a pad unit to be electrically connected to the first sensing electrodes and the second sensing electrodes, the touch screen panel including first trace lines connecting the first sensing electrodes and the pad unit, second trace lines connecting the second sensing electrodes and the pad unit, and a ground line connected to a ground power supply, the ground line being between the first trace lines and the second trace lines.

The first trace lines may be between the first sensing electrodes and the ground line.

The first trace lines may include at least one first step part formed in a direction moving away from the second trace lines.

The ground line may include a second step part to widen a width thereof.

The second step part of the ground line may be formed to correspond to the first step part of an adjacent first trace line.

The first trace lines may include the first step part, and a difference between a number of the first step part of adjacent first trace lines may be one.

The first sensing electrodes and the second sensing electrodes may cross each other.

The ground line may be connected to the pad unit, and the ground power supply may be supplied to the pad unit.

The ground line may be a same material as a trace line.

The second trace lines may be spaced by a predetermined distance from the ground line.

BRIEF DESCRIPTION OF THE DRAWINGS

The above and other features will become more apparent to those of skill in the art by describing in detail exemplary embodiments thereof with reference to the attached drawings in which.

DETAILED DESCRIPTION

Figure 1:
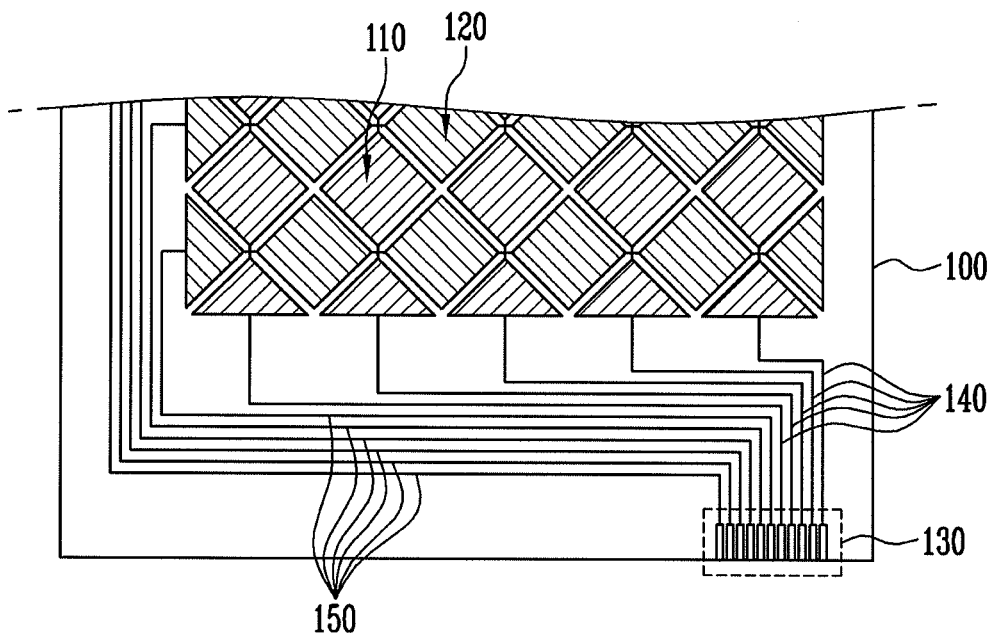
FIG. 1 shows a touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Herein, like reference numerals refer to like elements.

Hereinafter, a touch screen panel will be described with reference to exemplary embodiments and the drawings for describing them.

FIG. 1 shows a touch screen panel for explaining operational characteristics of a general touch screen panel. In FIG. 1, the touch screen panel, e.g., of the capacitance type, is situated at a touch active region on a substrate. A pad unit 130 is provided to connect a touch controller (not shown) with first sensing electrodes 110 and second sensing electrodes 120 (cross-arranged to each other) and a FPCB (Flexible Printed Circuit Board). A touch inactive region may be defined at the outskirts of the touch active region. The touch screen panel may include first trace lines 140 and second trace lines 150 electrically connecting each of first sensing electrodes 110, 120, and the pad unit 130, respectively. The trace lines 140, 150 may be extended into the pad unit 130 so as to connect to pad unit 130, which may be disposed in the inactive region at one side of the substrate 100. The first trace lines 140 may be situated fairly close to the second trace lines 150, e.g., at the inactive region at the one side of the substrate 100. In such a case, it may be possible for a coupling phenomenon to result between the first trace lines 140 and the second trace lines 150 adjacent to each other. Such a coupling phenomenon may cause noise to occur in signals that are conveyed through the trace lines 140, 150, and the accuracy of detecting a touch position on the touch screen panel may be degraded.

Figure 2:
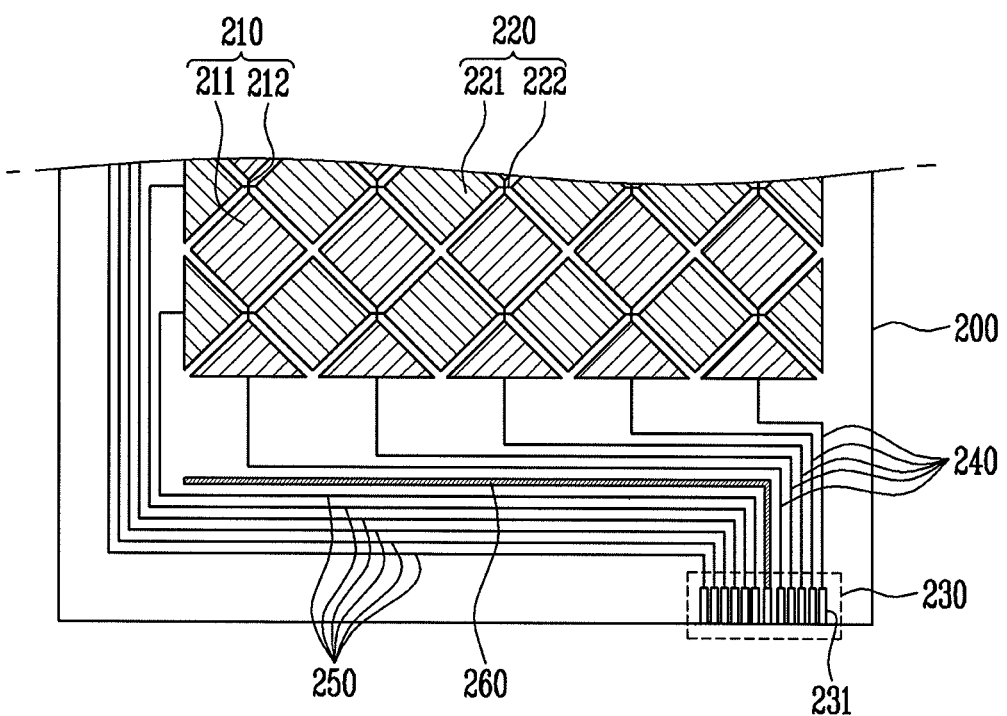
FIG. 2 shows a touch screen panel according to a first embodiment.

FIG. 2 shows a touch screen panel according to a first embodiment.

According to embodiments, a touch screen panel may be positioned in a front face of an image display apparatus. The touch screen panel may be implemented as a resistive type, an optical sensing type, a capacitance type, etc. The touch screen panel may replace separate input apparatuses connected to and operated with the image display apparatus, e.g., a keyboard and a mouse. Thus, the touch screen panel may have many uses and applications. The touch screen panel may be positioned in a front face of an image display apparatus to convert a contact position (which may be directly contacted with a human hand or an object) into electrical signals. For example, an instruction content selected at the contact position may be received as input signals.

In FIG. 2, the touch screen panel according to the first embodiment may include first sensing electrodes 210, second sensing electrodes 220, a pad unit 230, first trace lines 240, second trace lines 250, and a ground line 260.

The first sensing electrodes 210 and the second sensing electrodes 220 may be situated at a touch active region in a center of a substrate. In FIG. 2, each of the sensing electrodes 210 and 220 may be situated in the same layer as each other, or may be situated at a layer different from each other.

The touch active region can be set as, e.g., a display region. In such a case, the touch active region may be set with the region to be overlapped with pixels included in a display panel (not shown) disposed at a bottom of the touch screen panel.

The first sensing electrodes 210 and the second sensing electrodes 220 may be arranged so as to be crossed each other. In an example, the first sensing electrodes 210 are formed in a first direction (i.e., vertically) to be longer and a plurality of the first sensing electrodes 210 are arranged along a second direction (i.e., horizontally) crossed with the first direction, while the second sensing electrodes 220 are formed in the second direction to be longer and a plurality of the second sensing electrodes 220 are arranged along the first direction.

The first sensing electrodes 210 and the second sensing electrodes 220 preferably include sensing cells 211 and 221 having a predetermined area and connecting patterns connecting them each other In an example, the first sensing electrodes 210 include a plurality of first sensing cells 211 arranged at a predetermined interval along the first direction, and a plurality of first connecting patterns 212 electrically connecting the first sensing cells 211. The second sensing electrodes 220 include a plurality of second sensing cells 221 arranged at a predetermined interval along the second direction and dispersed among the first sensing cells 211 so as to not overlap with the first sensing cells 211, and a plurality of second connecting patterns 222 electrically connecting the second sensing cells 221.

The structure of each of the sensing electrodes 210 and 220 including the sensing cells 211, 221 and the connecting patterns 212, 222 is preferably used when the sensing electrodes 210, 220 are situated at the same layer each other, and can be formed of a type of a bar without the connecting patterns when the sensing electrodes 210, 220 are situated at a layer different from each other.

The first sensing electrodes 210 and the second sensing electrodes 220 are preferably formed of transparent conductive material such as ITO (Indium Tin Oxide), CNT (Carbon NanoTubes), Graphene, etc.

The pad unit 230 may be situated at a touch inactive region at one side of the substrate. The pad unit 230 may include a plurality of pads 231 connected to a flexible printed circuit board (not shown) at which each of the trace lines 240, 250 and a touch controller are situated The first trace lines 240 may be situated at the touch inactive region in the substrate 200 to allow the first sensing electrodes 210 to electrically connect to the corresponding pads 231, respectively.

The trace lines 250 may be present in a touch inactive region on the substrate 200, and may electrically connect the second sensing electrodes 220 to the corresponding pads 231, respectively.

Each of the trace lines 240, 250 may be extended the pad unit 230 so as to connect to the pad unit 230, which may be formed in the touch inactive region at one side of the substrate 200. The first trace lines 240 and second trace lines 250 may be situated fairly closely in the inactive region of the substrate 200. The touch inactive region may be a non-display region that is defined at the outskirts of the touch active region.

The first trace lines 240 and the second trace lines 250 may be formed of one or more low resistance materials, e.g., one or more of Mo, Ag, Ti, Cu, Al, Mo/Al/Mo, a transparent conductive material such as may be used in the formation of the sensing electrodes 210, 220, etc.

A ground line 260 may be situated between the first trace lines 240 and the second trace lines 250, e.g., in the inactive region at the one side of the substrate 200, and may be connected to a ground power supply. The ground power supply is preferably supplied to the pad connected to the ground line 260 so as to connect the ground line 260 and the ground power supply.

The ground line 260 may be formed between the first trace lines 240 and the second trace lines 250. Where the first trace lines 240 are formed on a same layer as the second trace lines 250, ground line(s) 260 may likewise be formed on the same layer between the first trace lines 240 and the second trace lines 250. Where the first trace lines 240 are formed in a layer different layer from the second trace lines 250, the ground line 260 may be on either layer or on another layer therebetween. Interposing the ground line 260 between the respective groups of first and second trace lines 240, 250 may reduce or eliminate a coupling phenomenon that might otherwise result between each trace lines 240, 250. Thus, detecting a touch position may be done more accurately.

The ground line 260 may be formed of, e.g., the same material(s) as the trace lines 240, 250, and may be manufactured by the same process to simplify the manufacturing process.

In an example embodiment, the ground line 260 is formed between the first trace lines 240 and the second trace lines 250, and the first trace lines 240 are situated between the sensing electrodes 210, 220 and the ground line 260. The second trace lines 250 may be situated outside of the ground line 260.

Figure 3:
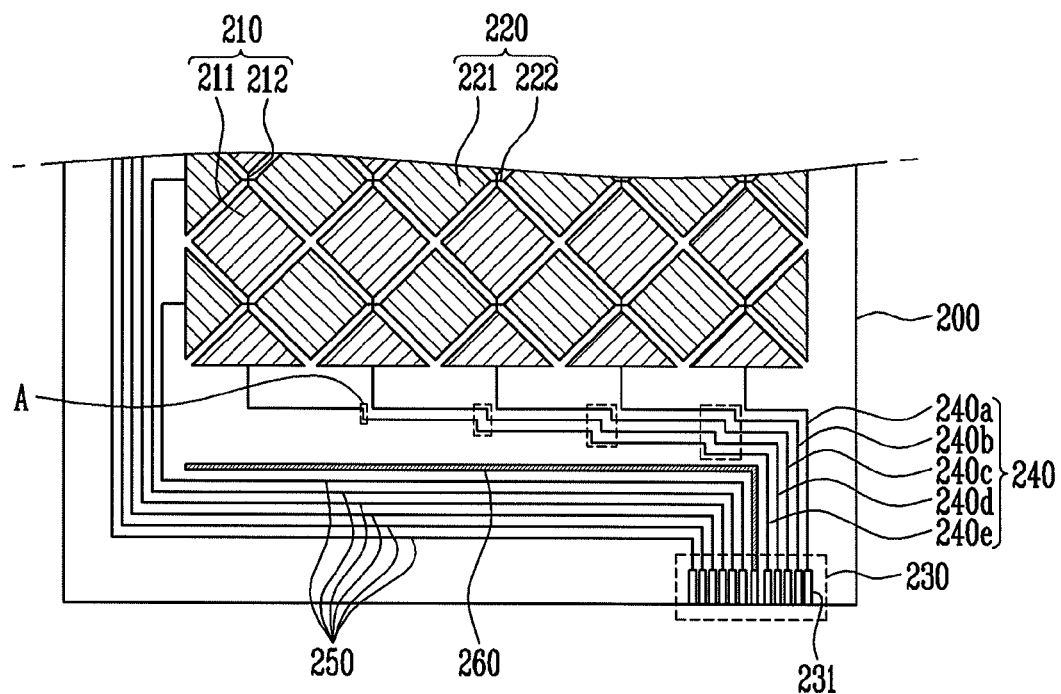
FIG. 3 shows a touch screen panel according to a second embodiment.

FIG. 3 shows a touch screen panel according to a second embodiment. Repetitive descriptions about portions that are the same as those in the above-described embodiment may be omitted.

A coupling phenomenon caused between the trace lines 240, 250 may be reduced by forming the ground line 260 between each of trace lines 240, 250. It may be preferable to also separate the second trace lines 250 from the first trace lines 240 to remove the coupling phenomenon. To this end, in the touch screen panel according to the second embodiment, a step part A is formed in the first trace lines 240.

In FIG. 3, for example, at least one instance of the step part A is formed in the 'b' to 'e' trace lines 240b to 240e among the group of first trace lines 240 that includes the 'a' to 'e' trace lines 240a to 240e.

The step part A may be a part where a segment, e.g., an offset, is formed in the first trace lines 240 and is especially formed in the direction of moving away from the second trace lines 250.

By way of example, the 'e' trace line 240e, which extends to the left so as to be horizontal from the right, enlarges the difference in distance with the second trace lines 250 by repeatedly forming the step part A, the step part A having a predetermined height difference from a top.

As shown in FIG. 3, the step part A is preferably formed to follow a shape (e.g., curved, angled, square cornered, etc.) of an adjacent first trace line 240. In an embodiment, a difference between a number of step parts A formed in a specific first trace line 240 and a number of the step parts A formed in the adjacent first trace line 240 is one.

In an example embodiment, as shown in FIG. 3, the step part A is not formed in the 'a' trace line 240a, one step part A is formed in the 'b' trace line 240b, two step parts A are formed in the 'c' trace lines 240c, three step parts A are formed in the 'd' trace lines 240d, and four step parts A are formed in the 'e' trace lines 240e. Therefore, the difference between the number of the step parts A of the first trace lines 240 adjacent to each other is one.

In the example shown in FIG. 3, the step part A is formed in the first trace lines 240 in the direction moving away from the second tracing lines 250, and a distance between the first trace lines 240 and the second trace lines 250 is kept apart. Therefore, the coupling phenomenon that might otherwise be caused between the first trace lines 240 and the second trace lines 250 may be reduced or eliminated.

It will also be appreciated that embodiments may provide for the shape of the first trace lines 240 to be changed without extending a space of the touch inactive region. Thus, increases in dead space may be avoided.

Figure 4:
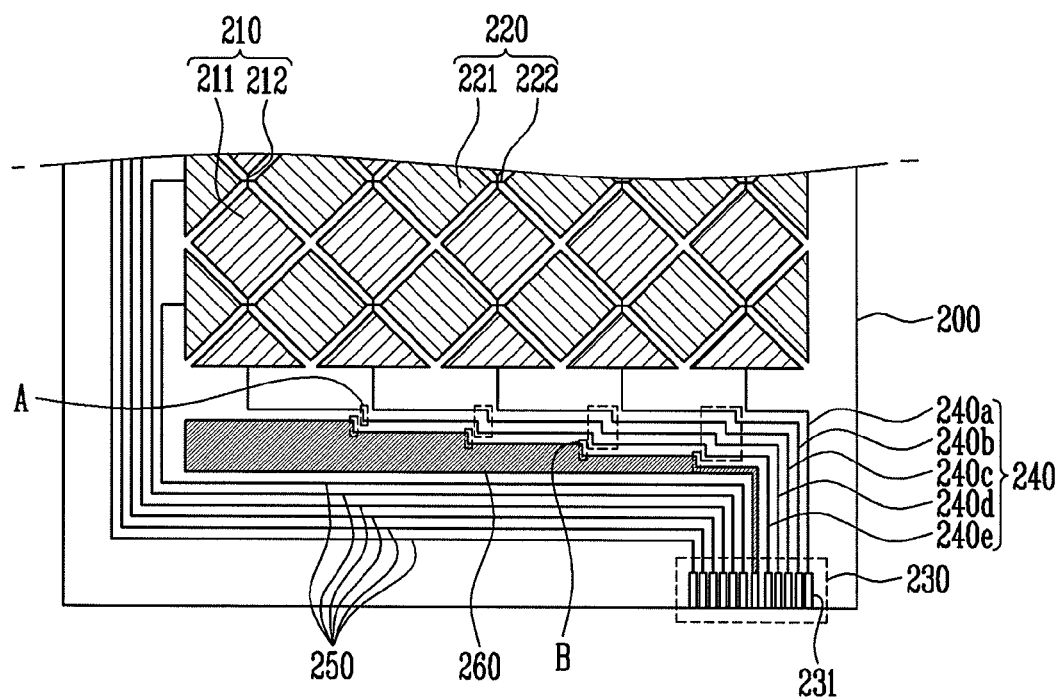
FIG. 4 shows a touch screen panel according to a third embodiment.

FIG. 4 shows a touch screen panel according to a third embodiment. Repetitive descriptions about portions that are the same as those in the above-described embodiment may be omitted.

According to the present embodiment, a width of the ground line 260 may be formed widely so as to more effectively shield electricity fields between the first trace lines 240 and the second trace lines 250. For example, in the touch screen panel according to the third embodiment, a step part B may be formed in the ground line 260 to widen a width of the ground line 260. For example, as shown in FIG. 4, the ground line 260 may be formed to correspond to the step part A of the adjacent 'e' trace line 240e.

In the example shown in FIG. 4, the step part B of the ground line 260 is also formed in the direction moving away from the second trace lines 250, as with the first trace lines 240, and the width of the ground line 260 is widened sequentially by the step part B. Thus, as the step part A is formed in the first trace lines 240, a space is produced between the first trace lines 240 and the ground line 260, such that the width of the ground line 260 can be extended using the empty space. Thus, a coupling phenomenon caused between each of trace lines 240, 250 may be more effectively reduced.

Figure 5:
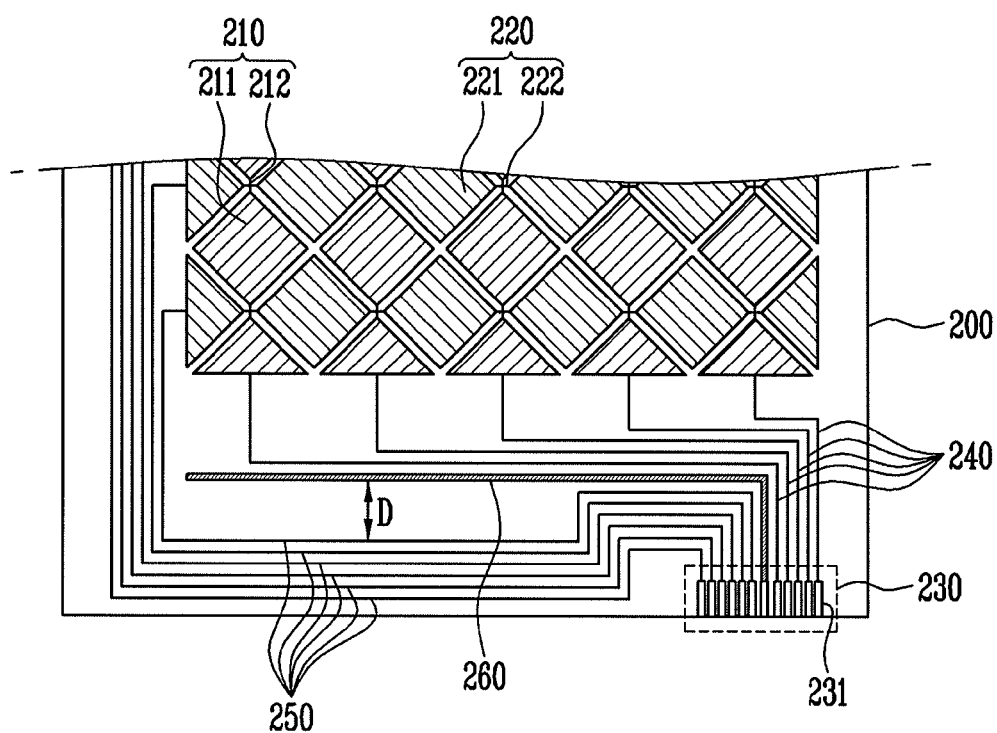
FIG. 5 shows a touch screen panel according to a fourth embodiment.

FIG. 5 shows a touch screen panel according to a fourth embodiment. Repetitive descriptions about portions that are the same as those in the above-described embodiment may be omitted.

In the touch screen panel according to the fourth embodiment, the second trace lines 250 are disposed to be spaced by a predetermined distance (for example, see distance D in FIG. 5) from the ground line 260 to enlarge the difference in distance between the first trace lines 240 and the second trace lines 250. The coupling phenomenon caused between the trace lines 240, 250 may be reduced by disposing the second trace lines to be spaced by a predetermined distance D from the ground line 260. The distance D between the second trace lines 250 and the ground line 260 may be determined with reference to the size, usage, etc. of the touch screen panel.

Exemplary embodiments have been disclosed herein, and although specific terms are employed, they are used and are to be interpreted in a generic and descriptive sense only and not for purpose of limitation. For example, FIG. 5 shows a case applied to the first embodiment described above as an example. However, a configuration of FIG. 5 can be also applied to the second embodiment and the third embodiment. Thus, while the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel including first sensing electrodes, second sensing electrodes, and a pad unit electrically connected to the first sensing electrodes and the second sensing electrodes, the touch screen panel comprising:
    first trace lines connecting the first sensing electrodes and the pad unit;
    second trace lines connecting the second sensing electrodes and the pad unit; and
    a ground line to be connected to a ground power supply, the ground line being between the first trace lines and the second trace lines, wherein:
    the first trace lines include a first first trace line having a first step part formed in a first direction parallel to an arrangement direction of the first sensing electrodes and moving away from a first second trace line, the first second trace line being a second trace line closest to the first first trace line at the first step part, the first step part increasing a distance between the first first trace line and the first second trace line by a first amount in the first direction, and
    the ground line includes a second step part corresponding to the first step part, the second step part widening the ground line by the first amount in the first direction.

2. The touch screen panel as claimed in claim 1, wherein the first trace lines are between the first sensing electrodes and the ground line.

3. The touch screen panel as claimed in claim 1, wherein the first trace lines include the first step part, and a difference between a number of the first step part of adjacent first trace lines is one.

4. The touch screen panel as claimed in claim 1, wherein the first sensing electrodes and the second sensing electrodes cross each other.

5. The touch screen panel as claimed in claim 1, wherein the ground line is connected to the pad unit, and the ground power supply is supplied to the pad unit.

6. The touch screen panel as claimed in claim 1, wherein the ground line is a same material as a trace line.

7. The touch screen panel as claimed in claim 2, wherein the second trace lines are spaced by a predetermined distance from the ground line.

* * * * *